United States Patent [19]

Griffin et al.

[11] Patent Number: 4,861,658
[45] Date of Patent: Aug. 29, 1989

[54] HYPOALLERGENIC JEWELRY AND METHOD OF MAKING THE SAME

[75] Inventors: Donald L. Griffin, West Chester; Ralph E. Pfister, Wayne, both of Pa.

[73] Assignee: Barriergen, Inc., Malvern, Pa.

[21] Appl. No.: 188,991

[22] Filed: May 2, 1988

[51] Int. Cl.⁴ .............................................. B32B 7/00
[52] U.S. Cl. ...................................... 428/336; 63/1.1; 424/78; 427/255.6
[58] Field of Search ..................... 427/255.6; 424/78; 63/DIG. 1-3, 1.1; 428/336

[56] References Cited

U.S. PATENT DOCUMENTS

| | | | |
|---|---|---|---|
| 3,246,627 | 4/1966 | Loeb et al. | 118/49 |
| 3,288,728 | 11/1966 | Gorham | 260/2 |
| 3,301,707 | 1/1967 | Loeb et al. | 117/227 |
| 3,333,169 | 7/1967 | Valley | 317/258 |
| 3,342,754 | 9/1967 | Gorham | 260/2 |
| 3,429,739 | 2/1969 | Tittmann et al. | 117/106 |
| 3,573,968 | 4/1971 | Loeb et al. | 111/106 |
| 3,600,216 | 8/1971 | Stewart | 117/72 |
| 3,908,046 | 9/1975 | Fitzpatrick et al. | 427/216 |
| 4,225,647 | 9/1980 | Parent | 428/336 |
| 4,291,244 | 9/1981 | Beach et al. | 307/400 |

*Primary Examiner*—Marion C. McCamish
*Assistant Examiner*—Dean Ray Cornstubble
*Attorney, Agent, or Firm*—Michael F. Petock

[57] ABSTRACT

Hypoallergenic jewelry and a method of making the same is achieved by providing vapor deposition of unsubstituted and substituted linear homopolymers and copolymers of poly(p-xylylene) on the jewelry having a thickness in the range of about 0.5 microns to about 25 microns. A new use of preventing allergic reactions when jewelry is worn is achieved by providing the jewelry with a poly(p-xylylene) polymer coating which provides a hypoallergenic surface on the jewelry.

18 Claims, No Drawings

HYPOALLERGENIC JEWELRY AND METHOD OF MAKING THE SAME

BACKGROUND OF THE INVENTION

The present invention relates to hypoallergenic jewelry and a method of making the same.

Although many, if not most people, in the developed nations wear jewelry of some type, including, but not limited to, wrist watches, rings, earrings and the like, a significant percentage of people suffer from allergic reactions to the jewelry. It has been estimated that anywhere from eight to twelve percent of the women in the U.S., depending upon age, suffer from allergic reactions to jewelry. It is also estimated that another 1.25 percent of men suffer from allergic reactions to jewelry. Although allergic reaction to jewelry is common in less expensive jewelry, it also occurs to a significant degree in expensive gold jewelry since it is difficult to isolate nickel and chromates, which are common causes of allergic reaction.

SUMMARY OF THE PRESENT INVENTION

In accordance with the present invention, jewelry is made hypoallergenic by providing it with a very thin coating of a substituted or unsubstituted poly(p-xylylene) polymer. The poly(p-xylylene) may be applied to the jewelry by vapor deposition. The coating is clear, very thin, and is not visible to the naked eye. The coating is applied evenly, even over sharp corners. The poly(p-xylylene) coating prevents allergic reaction.

In accordance with the present invention, the jewelry may be coated with the poly(p-xylylene) polymer layer or derivatives thereof by means of vapor deposition. The coating may be formed to have any suitable thickness, but a thickness in the range of about 0.5 microns to about 25 microns is currently preferred. Preferably, poly(chloro-p-xylylene) is utilized to provide a coating of about 5 microns in thickness.

The invention includes the novel use of using jewelry coated with a substituted or unsubstituted poly(p-xylylene) polymer to prevent allergic reactions when the jewelry is worn.

DETAILED DESCRIPTION OF THE PREFERRED EMBODIMENTS

This invention relates to hypoallergenic jewelry and a method of making such hypoallergenic jewelry by providing the jewelry with a thin coating in a preferred range of about 0.5 to about 25 microns in thickness of a substituted or unsubstituted poly(p-xylylene) polymer, although other suitable coating thickness may be utilized.

The poly(p-xylylene) polymers utilized in this invention are unsubstituted and substituted linear homopolymers and copolymers such as those disclosed in U.S. Pat. Nos. 3,288,728 and 3,342,754 to Gorham, U.S. Pat. No. 3,429,739 to Tittmann et al., U.S. Pat. No. 3,573,968 to Loeb et al., U.S. Pat. No. 3,600,216 to Stewart and U.S. Pat. No. 4,225,647 to Parent, the teachings of these patents are incorporated herein by reference. Two of the polymers currently preferred for use in the present invention, namely poly(chloro-p-xylylene) and poly(p-xylylene), are commercially available in dimer form from Union Carbide Corporation.

The p-xylylene polymers disclosed in the aforementioned U.S. patents have been established to form on a substrate through a mechanism which involves three general stages. In the first stage, a starting material which is preferably a cyclic dimer is vaporized. In the second stage, the vaporized dimer is heated to a temperature between about 450° C. to 700° C. where the starting material pyrolyses and cleaves to form vaporous para-xylylene diradicals which retain the same degree of substitution as the starting material. While maintaining diradical partial pressure below 1.0 mm. Hg, the diradicals will simultaneously condense and polymerize in the third stage onto any relatively cool substrate maintained at a temperature below about 200° C. at a rate which is dependent on an inverse logarithmic function of substrate temperature to form clear, tough linear polymers which exhibit excellent physical, chemical, electrical and thermal properties.

In accordance with the present invention, jewelry of various types may be coated by placing the jewelry in a vapor deposition chamber after preferably pretreating the jewelry to promote adhesion. Preferably, the jewelry may be pretreated with a plasma of one of the group of lower hydrocarbons, oxygen, argon, nitrogen or air carried out at a pressure 0.01 to 10 Torr. The presently preferred lower hydrocarbons are methane, ethane, propane, ethylene, propylene, butadiene and butene. Alternatively, the jewelry may be pretreated with silane such as is disclosed in U.S. Pat. No. 3,600,216 to Stewart, the teachings of which are incorporated herein by reference. Pretreatment is not required, but it improves the wear properties.

The reactive vaporous diradicals can be produced by the pyrolytic cleavage of at least one of the cyclic dimers represented generally by the structure

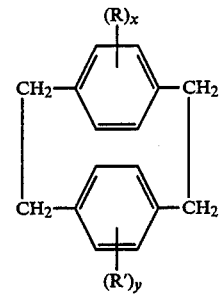

wherein R is an aromatic nuclear substituent and x and y are integers from 0 to 4, inclusive, thus forming 2 separate reactive vaporous diradicals having the structure:

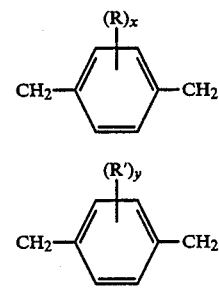

Thus, where x and y are the same, and the aromatic nuclear substituent on each diradical is the same, two moles of the same p-xylylene diradical are formed, and when condensed yield a substituted or unsubstituted p-xylylene homopolymer. When x and y are different or the aromatic nuclear substituents on each diradical are different, condensation of such diradicals will yield copolymers having the general structure:

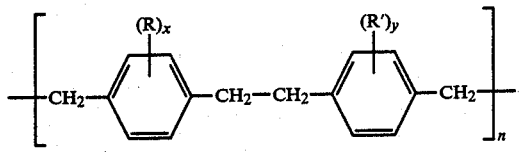

When x and y are the same and R and R' are the same, condensation of such diradicals will yield a homopolymer having the structure:

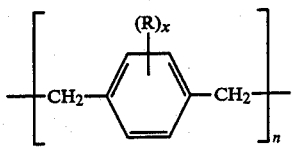

When x and y both equal zero, condensation of the diradicals will yield the unsubstituted p-xylylene homopolymer having the structure:

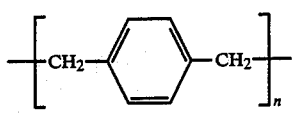

Since the polymerization coupling of these reactive diradicals does not involve the aromatic ring, any unsubstituted or nuclear substituted p-xylylene polymer may be prepared. The substituent groups may be any organic or inorganic group which may normally be substituted on the aromatic nuclei. Otherwise, the position on the aromatic ring is filled by a hydrogen atom. Illustrations of such groups include alkyl, aryl, acetoxy, alkenyl, amino-alkyl, arylamino, cyano, carboxyl, alkoxy, hydroxy, carbonyl, hydroxyl, nitro, halogen, sulfonic acids and esters thereof, phosphorus entities, sulfones, sulfides and alkyl sulfoxy entities which may be the same or different. One particularly presently preferred substituent comes from the halogen group, namely chlorine. The method of preparing the substituted di-p-xylylenes from which these reactive diradicals may be prepared are known in the art and can be prepared by known methods from the cyclic dimer di-p-xylylene, by appropriate treatment, such as halogenation, acetylation, cyanolation, alkylation, and/or oxidation and reduction and like methods of introduction of such substituent groups into aromatic nuclei.

Any suitable poly(p-xylylene) polymer may be employed as the coating material of this invention. Typical poly(p-xylylene) polymers include poly(chloro-p-xylylene), poly(dichloro-p-xylylene), poly(cyano-p-xylylene), poly(iodo-p-xylylene), poly(fluoro-p-xylylene), poly(hydroxymethyl-p-xylylene), poly(ethyl-p-xylylene), poly(methyl-p-xylylene), poly(aminomethyl-p-xylylene), poly(carboxy-p-xylylene), poly(carbomethoxy-p-xylylene), and mixtures thereof.

Once the jewelry is coated, it is removed from the vapor deposition chamber. Tests have been performed with respect to coated jewelry and uncoated jewelry on sensitive human beings with the result being that jewelry coated in accordance with the method of the present invention produces no detectable allergic reaction whereas uncoated jewelry and other metallic articles produce an allergic reaction. The following are examples.

EXAMPLE 1

A half-dollar was coated with poly(chloro-p-xylylene) on its surface to a thickness of about 5 microns. A second half-dollar was not coated. The poly(chloro-p-xylylene) coated half-dollar was taped to the wrist of a young female known to be sensitive to nickel. The uncoated half-dollar was taped to her other wrist. The half-dollars were left on overnight. The wrist to which the poly(chloro-p-xylylene) coated half-dollar coin was taped did not cause an allergic rash on her wrist, but the uncoated coin did. For the next night the coins were switched between the wrists, and again on the following morning the poly(chloro-p-xylylene) coated half-dollar coin did not produce an allergic reaction in the form of a rash and the uncoated half-dollar coin did. Approximately 3 weeks later the same young lady repeated the aforesaid procedure with the same result, namely that the half-dollar coin coated with poly(chloro-p-xylylene) did not cause an allergic rash whereas the uncoated half-dollar coin did.

EXAMPLE 2

Approximately 2 weeks later the same test was performed on another young lady known to be sensitive to nickel. The half-dollar coin coated with poly(chloro-p-xylylene) polymer was taped to her left wrist for 8 hours and the uncoated half-dollar coin was taped to her right wrist. The left wrist, to which the poly(chloro-p-xylylene) coated coin was taped, did not have an allergic reaction in the form of a rash. The right wrist, which had the uncoated coin, had an allergic reaction in the form of a red rash in the shape of a circle and the size of the half-dollar coin.

EXAMPLE 3

A different woman, 19 years of age, wore a set of 10 carat gold pierced earrings. After 3 hours the skin in contact with the earrings was red and irritated. Subsequently, the earrings were coated with a layer 5 microns thick of poly(chloro-p-xylylene) with occasional vibration to insure the coating of all surfaces. The same woman wore the coated earrings continuously for ten days with no noticeable redness or irritation.

EXAMPLE 4

A 14 carat post, pearl earring was coated with a layer 5 microns thick of poly-p-xylylene. The same female in example one was given this earring and its uncoated matching earring. The subject visually could not tell the coated from the uncoated earring. In wearing both earrings at the same time, the uncoated earring elicited within 2 hours redness and irritation in the skin that was in contact. The coated earring elicited no response after 24 hours of wearing.

EXAMPLE 5

Five women known to be allergic to jewelry were studied in a clinical setting by a dermatologist. Each woman had two nickel alloy test disks taped to her forearm. One disk was coated with a layer 5 microns thick of poly(chloro-p-xylylene), the other was uncoated. After 24 hours the subjects were examined by the dermatologist. In four cases the uncoated test disk showed a marked reaction characterized by redness, papules, vesicles, and edema. In the other case the subject showed a moderate reaction to the uncoated disc, characterized by redness and papules. All five of the subjects showed no reaction to the coated disk.

In view of the above, the present invention may be embodied in other specific forms without departing from the spirit or essential attributes thereof and, accordingly, reference should be made to the appended claims, rather than to the foregoing specification as indicating the scope of the invention.

We claim:

1. An article of manufacture adapted to be worn in juxtaposition to a living human or animal body, comprising:
   a metal substrate containing at least a predetermined small amount of an allergen; and
   a coating applied to and bonded to said metal substrate, said coating being comprised of a layer of poly(p-xylylene) polymer to provide a hypoallergenic surface on said metal substrate to eliminate the formation of an allergenic reaction by said living body.

2. An article of manufacture in accordance with claim 1 wherein said poly(p-xylylene) polymer is unsubstituted poly(p-xylylene) polymer.

3. An article of manufacture in accordance with claim 1 wherein said poly(p-xylylene) polymer is substituted poly(p-xylylene) polymer.

4. An article of manufacture in accordance with claim 3 wherein said coating is comprised of poly(chloro-p-xylylene) polymer.

5. An article of manufacture in accordance with claim 1 wherein said poly(p-xylylene) polymer is a combination of substituted and unsubstituted poly(p-xylylene) polymer.

6. An article of manufacture in accordance with claim 1 wherein said coating of poly(p-xylylene) polymer has a thickness of about 5 microns.

7. An article of manufacture in accordance with claim 1 wherein said coating of poly(p-xylylene) polymer has a thickness in the range of about 5 to about 25 microns.

8. An article of manufacture in accordance with claim 1 wherein said metal substrate contains an allergen selected from the group consisting of nickel and chromates.

9. An article of manufacture in accordance with claim 1 wherein said coating of poly(p-xylylene) polymer is provided by vapor deposition.

10. An article of manufacture in accordance with claim 1 wherein said metal substrate has been pretreated with a plasma.

11. An article of manufacture in accordance with claim 1 wherein said metal substrate has been treated with a plasma selected from the group consisting of methane, ethane, propane, ethylene, propylene, butadiene, butene, oxygen, argon, nitrogen and air.

12. A new use for a poly(p-xylylene) polymer coating being the application of said coating to a substrate containing an allergen which is adapted to be worn in contact with a living body and thereby preventing an allergic reaction when the substrate is worn on a living body.

13. A new use for a poly(chloro-p-xylylene) polymer coating being the application of said coating to a substrate containing an allergen which is adapted to be worn in contact with a living body and thereby preventing an allergic reaction when the substrate is worn on a living body.

14. A process comprising the steps of:
   selecting metal substrates that are adapted to be placed in contact with a living human or animal body;
   determining the likelihood that said selected metal substrates may contain an allergen selected from the group consisting of nickel and chromates; and
   coating said selected metal substrates that are determined to contain an allergen with a poly(p-xylylene) polymer.

15. A process in accordance with claim 14 wherein said coating step comprises the step of condensing vaporous p-xylylene diradicals onto said selected metal substrates that are determined to likely contains an allergen.

16. A process in accordance with claim 14 further including the step of pretreating the selected metal substrates that are determined to likely contain an allergen with a plasma.

17. A process in accordance with claim 14 further including the step of pretreating the selected metal substrates that are determined to likely contain an allergen with a plasma selected from the group consisting of methane, ethane, propane, ethylene, propylene, butadiene, butene, oxygen, argon, nitrogen and air.

18. A process comprising the steps of:
   selecting metal substrates that are adapted to be placed in contact with a living human or animal body;
   determining the likelihood that said selected metal substrates may contain an allergen; and
   coating said selected metal substrates that are determined to contain an allergen with a poly(chloro-p-xylyene) polymer.

* * * * *

UNITED STATES PATENT AND TRADEMARK OFFICE
CERTIFICATE OF CORRECTION

PATENT NO. : 4,861,658
DATED : August 29, 1989
INVENTOR(S) : Donald L. Griffin and Ralph E. Pfister It is certified that error appears in the above-identified patent and that said Letters Patent is hereby corrected as shown below:

Column 5, line 47, delete "5" and substitute therefor --.5--.

Claim 15, line 4, delete "contains" and substitute therefor --contain--.

Signed and Sealed this

Seventeenth Day of July, 1990

Attest:

HARRY F. MANBECK, JR.

*Attesting Officer*  *Commissioner of Patents and Trademarks*